Dec. 18, 1923.
W. R. COULTER
1,478,176
GEAR SHIFT AND BRAKE CONTROL
Filed Oct. 6, 1922    2 Sheets-Sheet 1
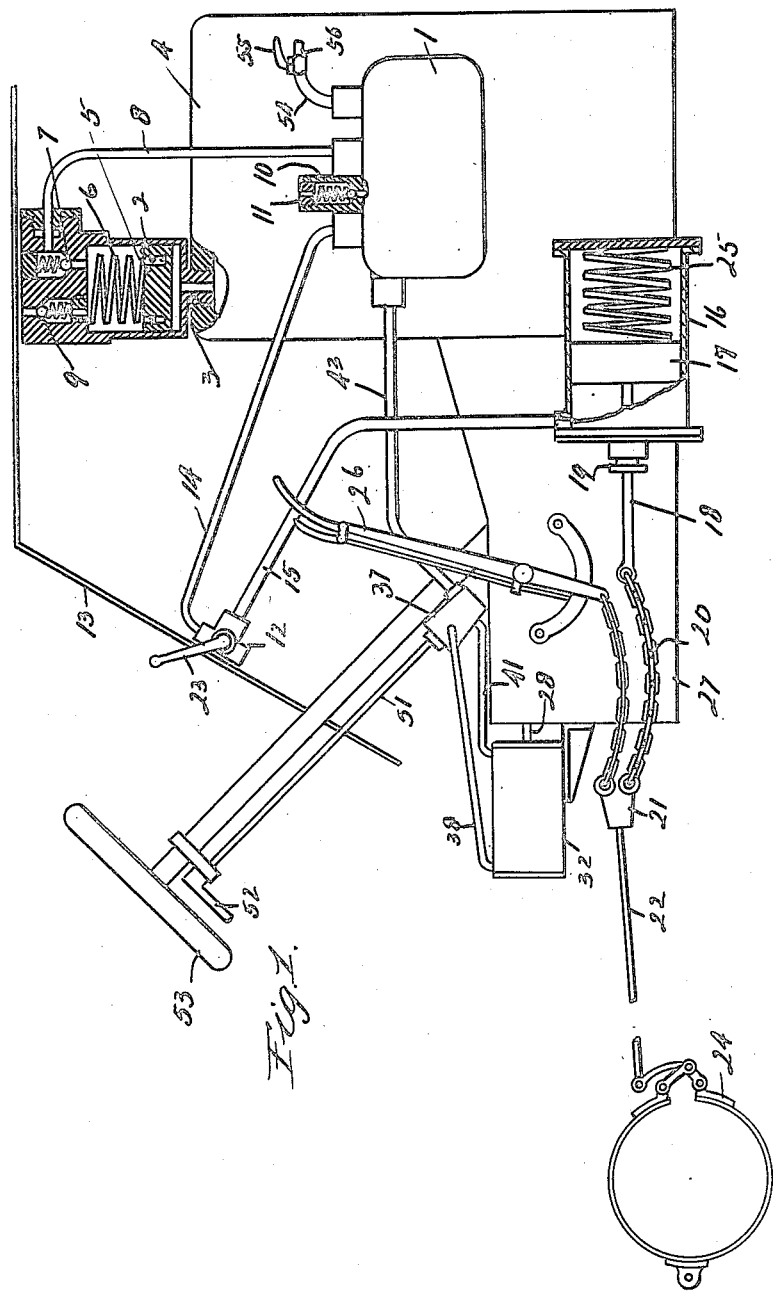
Inventor
William R. Coulter
By W. W. Williamson
Atty.

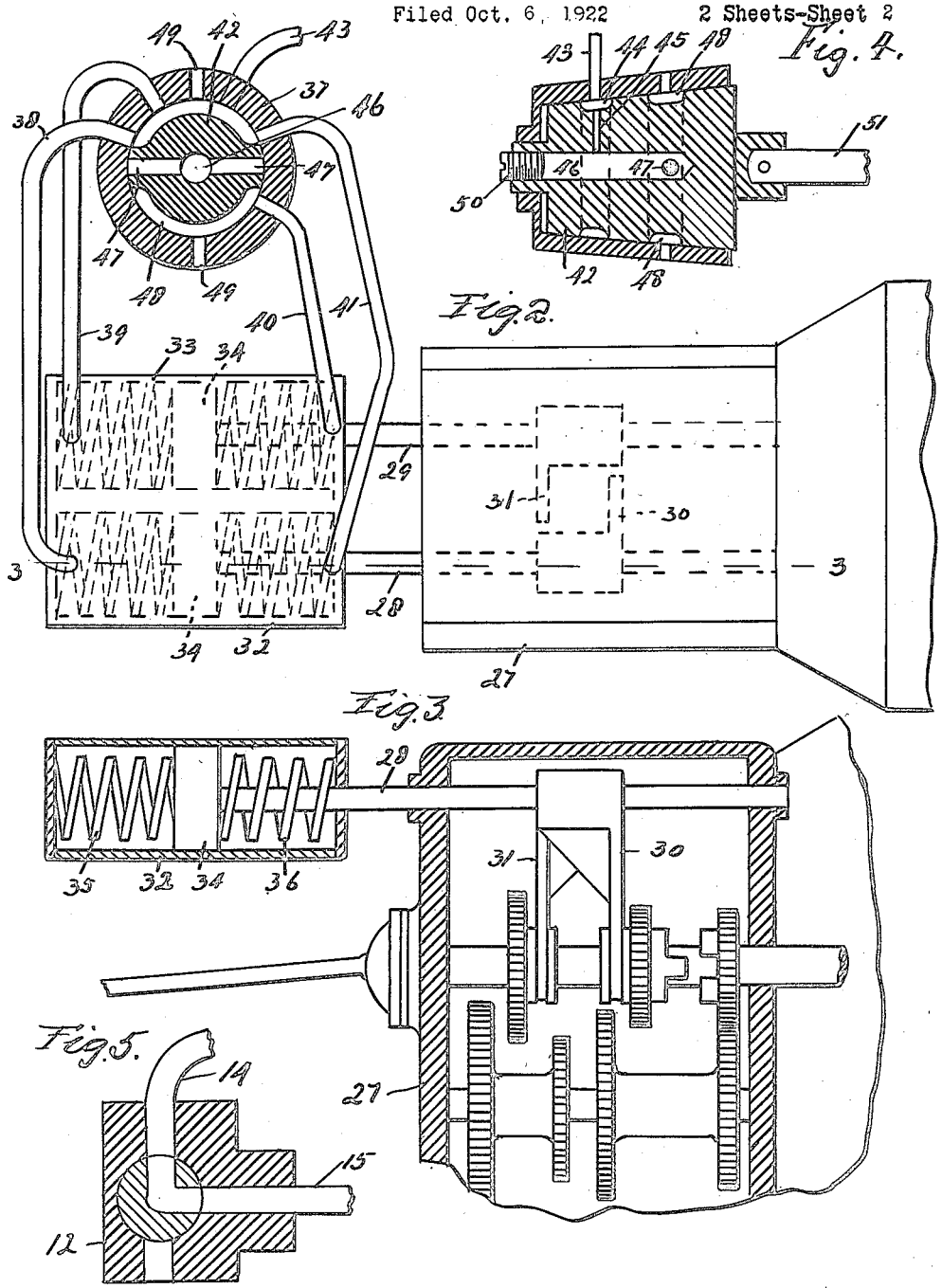

Patented Dec. 18, 1923.

1,478,176

UNITED STATES PATENT OFFICE.

WILLIAM R. COULTER, OF ALLENTOWN, PENNSYLVANIA.

GEAR SHIFT AND BRAKE CONTROL.

Application filed October 6, 1922. Serial No. 592,713.

*To all whom it may concern:*

Be it known that I, WILLIAM R. COULTER, a citizen of the United States, residing at 363 Union Street, Allentown, in the county of Lehigh and State of Pennsylvania, have invented new and useful Improvements in a Gear Shift and Brake Control, of which the following is a specification.

My invention relates to new and useful improvements in gear shifts and brake controls, and has for its object to provide for automatically storing air under pressure upon an automobile by the action of the engine and to utilize this compressed air through suitable control mechanism for applying the emergency brake and also for operating the gear shift as well as supplying air for the inflation of the pneumatic tire of the automobile.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is an elevation showing the various elements of the device, certain portions thereof being broken away to illustrate the interior construction of certain parts.

Fig. 2, is a plan view of an automobile gear shift casing showing a horizontal section of the multiple control valve and also showing the pipes leading from said valve to the control cylinders.

Fig. 3, is a section at the line 3—3 of Fig. 2.

Fig. 4, is a vertical central section of the multiple control valve.

Fig. 5, is a similar view of the 3-way valve for controlling the admission of air to the brake cylinder.

In carrying out my invention as here embodied, 1 represents an air reservoir which may be made of any suitable design and mounted upon any suitable portion of the machine in order that air may be stored therein under pressure for distribution for the various purposes hereinafter described.

2 represents an air compressor having a threaded shank 3 for screwing into the pet cock hole of one of the cylinders of the engine 4 or this compressor may be attached in any other suitable manner to one of the cylinders. This compressor has a piston 5 fitted to slide therein and actuated in one direction by the spring 6 so that when the pressure within the engine cylinder is sufficient to force the piston 5 upward against the action of the spring 6 the air in the space above this piston 5 will be forced through the spring pressed valve 7 and be conveyed by the pipe 8 to the reservoir 1; and when the pressure in the engine cylinder has ceased the spring 6 will force the piston 5 downward drawing in air through the spring pressed valve 9. By this arrangement when the cylinder of the automobile is in operation the reservoir will be automatically filled with air under pressure, this pressure being determined by the blow off valve 10 which may be adjusted to accomplish this result by means of the threaded plug 11.

12 represents a 3-way valve preferably secured to the instrument board 13 of the automobile and this valve is connected with the reservoir by the pipe 14 and is also connected by the pipe 15 to the brake cylinder 16. Within the cylinder 16 is fitted the piston 17 adapted to travel back and forth therein and carrying therewith the piston rod 18 which passing through the stuffing box 19 is connected by a chain 20 or other flexible means to the head block 21 secured upon the brake rod 22.

23 represents a hand lever for operating the 3-way valve 12 and by the proper manipulation of this lever air will be admitted from the reservoir 1 to the cylinder 16 thus applying force to the piston 17 for operating the emergency or other brake 24.

When it is desired to release the brake 24 a reverse movement of the lever 23 will shut off air flowing through the pipe 14 and permit the escape of air from the cylinder 16 through the pipe 15, the spring 25 serving to move the piston 17 in the reverse direction to release the brake. If desired the ordinary emergency brake lever 26 may be also coupled to the head block 21 in order that the brake 24 may be operated either by hand or power.

27 represents the gear shift casing in which the usual gears and gear shift mechanisms are housed and as these gears and gear shift mechanisms are no part of my invention I have not shown the same in complete detail nor is it necessary to explain the same except that the shift rods 28 and 29 which actuate the forks 30 and 31 extend through said casing and into the gear shift cylinders 32 and 33, each of said cylinders having a piston 34 to which one of said rods is connected. Each of these gear shift cylinders is provided with the springs 35 and 36 disposed on either side of each piston in order to normally hold said pistons in a neutral position for the purpose hereinafter set forth.

37 represents a multiple control valve with which connect the pipes 38, 39, 40 and 41, said pipes in turn being connected with the heads of the cylinders 32 and 33 so disposed that by turning the rotor 42 of the valve 37 in the proper direction air will be admitted from the pipe 43 leading from the reservoir 1 to the proper end of the proper cylinder to effect the actuation of one or the other of the pistons 34 for the movement of the shifting rods to bring about the proper meshing of the shift gears within the casing 27 and also to effect the exhausting of air from said cylinders, as for example, the compressed air admitted to the valve through the pipe 43 will flow into the groove 44 formed around the lower portion of the rotor 42 thus being in constant communication with the hole 45 with the interior chamber 46 from thence will flow through the holes 47 to whichever of the pipes 38, 39, 40 or 41 may be in alignment therewith and from thence to the proper end of the proper cylinder, the grooves 49 formed partially around the upper portion of the rotor communicating at the same time with the remaining of the last named pipes will permit air to be exhausted from the proper ends of the proper cylinders, said exhaust air escaping through the holes 49 to the atmosphere as will be readily understood.

By this arrangement only one of the pistons 34 can be actuated at a time and in sequence to bring about the desired gear shift and as soon as the rotor of the multiple control valve is brought to neutral as shown in Figs. 2 and 4, reaction of the springs 35 and 36 will bring the pistons and the forks to their neutral position.

The chamber 46 is preferably closed by a threaded plug 50 and the rotor 42 has connected therewith a rod 51 which terminates in an operating lever or handle 52 in close proximity to the steering wheel 53 so that the actuation of the gear shifting mechanism may be readily accomplished by the person operating the automobile.

54 represents a pipe leading from the reservoir 1 and having a stop cock 55 therein terminating in a connection 56 by which a flexible hose may be led from said pipe to the air valves of the pneumatic tires of the machine for the inflation of said tires.

From the foregoing description it will be seen that when an automobile is equipped with my improved devices not only may the tires be readily inflated but the emergency or the brake may be applied with but little effort on the part of the operator and also that the gears may be shifted by the simple and easy manipulation of the hand lever 52 thus overcoming the serious disadvantage of the application of excessive manual labor to effect these operations.

Although the invention has been described in connection with an internal combustion engine it is to be understood that it may be used with a steam engine or other motor to produce and utilize compressed air.

Of course I do not wish to be limited to the exact details of construction as herein shown as these may be varied within the limits of the appended claims without departing from the spirit of my invention.

Having thus fully described my invention, what I claim as new and useful is:—

1. In a combined control for the gear shift and brake of an automobile, a piston secured to each of the two gear shift rods of the machine, cylinders in which said pistons are fitted to slide, springs located in the cylinders so as to normally hold said pistons in a neutral position, means for admitting and exhausting air to and from said cylinders in sequence for actuating the pistons against such springs whereby the actuation of the gear shift rods is accomplished, a brake cylinder, a piston fitted to slide therein, a spring for actuating said piston in one direction, a piston rod carried by the last named piston means for connecting said piston rod with a brake rod of the machine, and means for admitting and exhausting air from one end of said brake cylinder.

2. In a device of the character described, a piston secured to each of the two gear shift rods of the machine, cylinders in which said pistons are fitted to slide, springs located in the cylinders so as to normally hold said pistons in a neutral position, and means for admitting and exhausting air to and from said cylinders in sequence for actuating the pistons against said springs whereby the actuation of the gear shift rods is accomplished.

3. In combination with a device of the character described, a multiple control valve comprising a casing, a rotor fitted to revolve in said casing, said rotor having an air receiving groove and an air exhausting groove, means for supplying air to the air receiving groove, a series of pipes leading from the casing, means for directing the air from the air receiving groove to any one of said pipes, and means for exhausting air into and from the exhaust grooves.

In testimony whereof, I have hereunto affixed my signature.

WILLIAM R. COULTER.